United States Patent [19]

Bang

[11] Patent Number: 5,781,362
[45] Date of Patent: Jul. 14, 1998

[54] SERVO CONTROL SYSTEM FOR DRIVING A VOICE COIL MOTOR WITH PULSE WIDTH AND GAIN CONTROL

[75] Inventor: Ho-Yul Bang, Suwon, Rep. of Korea

[73] Assignee: SamSung Electronics Co., Ltd., Suwon, Rep. of Korea

[21] Appl. No.: 769,440

[22] Filed: Dec. 19, 1996

[30] Foreign Application Priority Data

Dec. 20, 1995 [KR] Rep. of Korea ............... 1995-52593

[51] Int. Cl.$^6$ .................................................. G11B 5/596
[52] U.S. Cl. .................................... 360/78.05; 360/78.04
[58] Field of Search ........................... 360/78.05, 78.04, 360/78.12, 78.09, 75; 369/44.32, 44.34, 44.36, 44.29

[56] References Cited

U.S. PATENT DOCUMENTS

| | | |
|---|---|---|
| 4,575,776 | 3/1986 | Stephens et al. . |
| 4,727,530 | 2/1988 | Tomisawa .................. 369/59 |
| 4,835,633 | 5/1989 | Edel et al. . |
| 4,914,644 | 4/1990 | Chen et al. . |
| 4,965,501 | 10/1990 | Hashimoto . |
| 5,146,440 | 9/1992 | Yamaguchi et al. . |
| 5,369,345 | 11/1994 | Phan et al. ............. 360/78.04 |
| 5,384,524 | 1/1995 | Romano . |
| 5,444,582 | 8/1995 | Suzuki . |

*Primary Examiner*—Nabil Hindi
*Attorney, Agent, or Firm*—Robert E. Bushnell, Esq.

[57] ABSTRACT

Disclosed is a drive control circuit for driving a VCM, wherein the voice coil motor is driven by the current corresponding to the level of a PWM signal and a current gain selected by a switching operation according to the servo control modes. The switching operation is performed after a delay for the duration between the starting point of the pulses of the PWM signal and the time of the overshooting of the VCM being minimized.

20 Claims, 4 Drawing Sheets

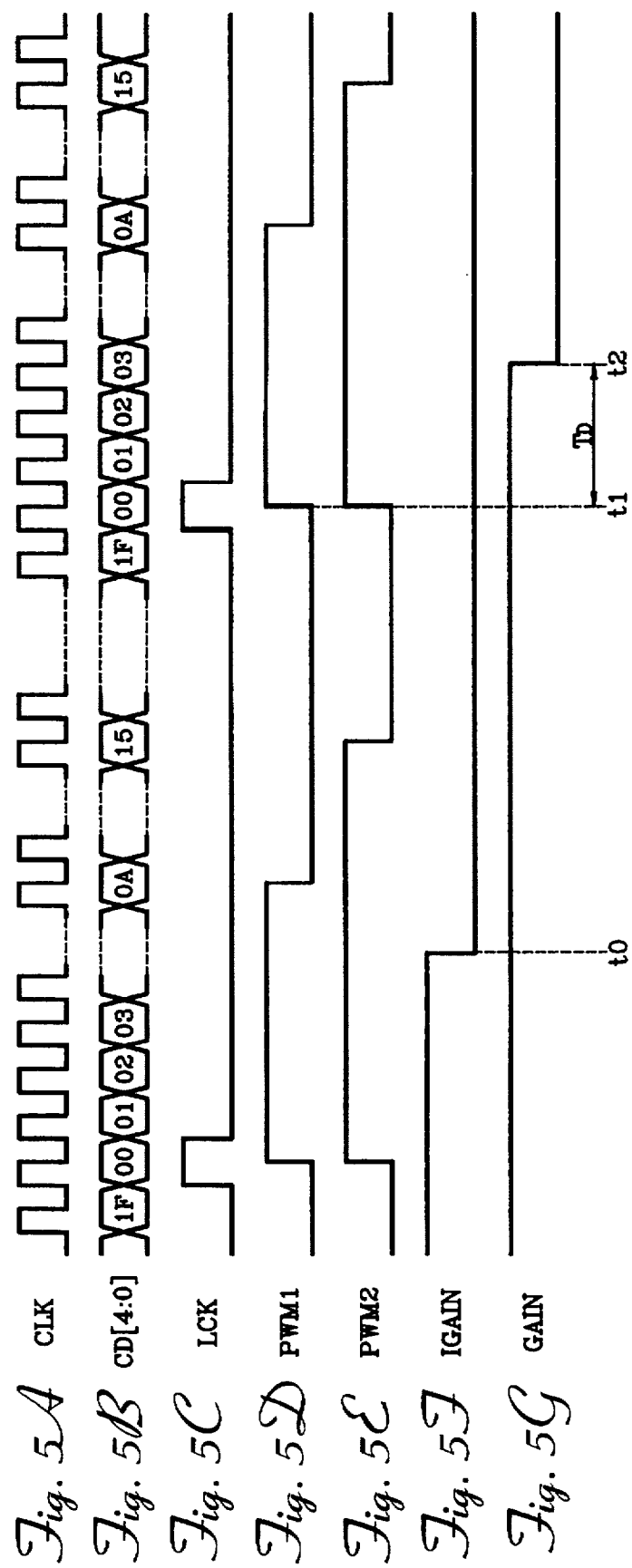

SERVO CONTROL SYSTEM FOR DRIVING A VOICE COIL MOTOR WITH PULSE WIDTH AND GAIN CONTROL

CLAIM FOR PRIORITY UNDER 35 U.S.C. §119

This application makes reference to, incorporates the same herein, and claims all benefits accruing under 35 U.S.C. §119 from an application for *Drive Control Circuit For A Voice Coil Motor* earlier filed in the Korean Industrial Property Office on 20 Dec. 1995 and there duly assigned Ser. No. 52593/1995.

BACKGROUND OF THE INVENTION

1. Technical Field

The present invention relates to a servo control system, and more particularly relates to a servo control system for controlling operation of a voice coil motor in a computer mass storage device.

2. Background Art

Generally, hard disk drives (HHD) are used as auxiliary memory devices in computer systems to magnetically write a great amount of data information on rotating magnetic disks and to access the data information at high speed for reproduction. Each HHD includes multiple disks with concentric data tracks containing data information, a magnetic head for reading or writing data onto the various tracks, and an actuator connected by a support arm assembly to the magnetic head for moving the magnetic head across the disk surface at high speeds to a desired track and maintaining the head over the track centerline during read or write operations. The movement of the magnetic head to a desired track is referred to as tracking "seeking" during a track seeking mode, while the maintaining the magnetic over the track centerline of the desired track during a read or write operation is referred to as track "following" during a track following mode. The track seeking mode may be known as either a long or a short track seeking mode in dependence upon to a number of data tracks that the magnetic head has to cross through.

The actuator is typically a "voice coil motor" (VCM) which comprises a coil movable through the magnetic field of a permanent stator. The application of current to the VCM causes the coil, and thus the attached magnetic head, to move radially. The acceleration of the coil is proportional to the applied current. Thus, the applied current flowing through the coil is regulated during the track "seeking" operation. However, no current is applied to the coil when the magnetic head is perfectly stationary over a desired track.

In high performance HHDs which have high density data tracks on the disk, it is necessary to incorporate a servo control system including a VCM drive circuit to drive the VCM so as to maintain the magnetic head precisely over the centerline of the desired track during read or write operations. Exemplary configurations of known servo control system are disclosed, for example, in U.S. Pat. No. 4,575,776 for *Magnetic Recording Disk File Servo Control System Including An Actuator Model For Generating A Simulated Head Position Error Signal* issued to Stephens et al., U.S. Pat. No. 4,835,633 for *Disk File Digital Servo Control System With Compensation For Variation In Actuator Acceleration Factor* issued to Edel et al., U.S. Pat. No. 4,914,644 for *Disk File Digital Servo Control System With Coil Current Modeling* issued to Chen et al., U.S. Pat. No. 4,965,501 for *Servo Circuit* issued to Hashimoto, and U.S. Pat. No. 5,384,524 for *Voice Coil Motor Control Circuit And Method For Servo System Control In A Computer Mass Storage Device* issued to Romano.

In general, a central processing unit (CPU) generates a digital control signal corresponding a target speed in accordance with the number of tracks to move. The digital control signal is then converted to an analog signal representing a drive voltage $V_D$ by a digital-to-analog converter. A VCM drive circuit then drives the VCM by the current corresponding to the drive voltage $V_D$ in a long or short track seeking mode. When reaching near the desired track on the disk, the CPU adjusts the current gain and performs position control on the VCM for positioning the magnetic head over the centerline of the desired track. The current gain applied to the VCM drive circuit is switched between a long track seeking mode, a short track seeking mode, and a track following mode. As a result of such an abrupt current gain switching, the VCM would often cause the magnetic head to undershoot or overshoot the target track when the magnetic head is moved between tracks, which will result in an unacceptable delay in the arrival of the magnetic head to the target track centerline.

Earlier efforts in the art to control the VCM more precisely are realized by two techniques. The first technique seeks to improve the resolution capability of the digital-to-analog converter. However, this can be costly and extremely difficult to implement, and consequently, is not popular in the art. The second technique seeks to employ a pulse width modulated (PWM) signal as the drive voltage VD to adjust the current of the VCM. The current adjustment is achieved by simply changing the duty of the PWM signal as disclosed, for example, in U.S. Pat. No. 5,444,582 for *Disk Drive Servo Control With Pulse Width And Amplitude Control For A Position Servo Signal* issued to Suzuki. However, the gain switching still causes the magnetic head to overshoot due to the abrupt change of the current amount applied to the VCM between the pulses of the PWM signal. In order to minimize such overshooting, the timing of the gain switching has been controlled by software, which sets the timer of the CPU to properly delay the gain switching. However, the timing of the gain switching inevitably requires the CPU to wait for a delay time set by the timer and considerably overloads the CPU.

SUMMARY OF THE INVENTION

Accordingly, it is therefore an object of the present invention to provide an improved servo control system for controlling operation of a voice coil motor (VCM) to position a transducer head over a magnetic disk.

It is also an object to provide a servo control system which minimizes the track undershoot and track overshoot when a transducer head is moved between tracks.

It is another object to provide a servo control system which minimizes the delay in the arrival of a transducer head to a target track centerline during read or write operations.

It is yet another object to provide a servo control system for driving a VCM by automatically and stably performing the gain switching each time a servo control mode is changed between a long track seeking mode, a short track seeking mode, and a track following mode.

These and other objects of the present invention can be achieved by a servo control system for driving a VCM by the current corresponding to the level of a PWM signal and a current gain selected by a switching operation according to servo control modes. The switching operation is performed after a delay for the duration between the starting point of the pulses of the PWM signal and the time of the overshooting of the VCM being minimized. The servo control system includes a voice coil motor drive circuit for driving the VCM to position a transducer head over a disk by a control current generated in response to a drive voltage and adjusted to one of a high current and a low current in response to gain switching data; a data controller for generating control data including gain control data for generation of gain switching data, first and second level control data to variably adjust the level of the drive voltage in accordance with a servo control mode of operation; a counter for repeatedly counting clock pulses of a given frequency from an initial value to a last value within a count range to generate count data; a latch for latching the control data to produce the gain control data, the first and second level control data, and delayed data at each time of said initial value is reached by the counter; a gain switching generator for generating gain switching data for adjustment of the control current to one of high current and low current in response to reception of the delayed data at each time the count data corresponds to the delayed data; and a pulse width modulated signal generator for generating as the drive voltage a first and a second pulse width modulated signal each having a duty corresponding to a respective value of the first and second level control data at a period of the count range.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 5A to 5G are signal timing diagrams of the servo control system as shown in FIG. 2.

DETAILED DESCRIPTION OF THE PREFERRED EMBODIMENT

Figure 1:
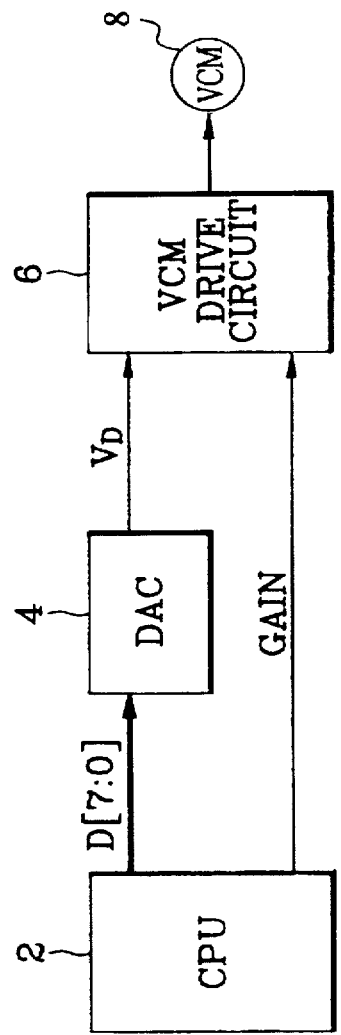
FIG. 1 illustrates a typical servo control system including a VCM drive circuit for driving a VCM.

Referring now to the drawings and particularly to FIG. 1, which illustrates a typical servo control system for controlling operation of a voice coil motor (VCM) so as to position a transducer head over a desired track. The servo control system includes a central processing unit (CPU) 2, a digital-to-analog converter (DAC) 4, a VCM drive circuit 6 and a VCM 8. The VCM drive circuit 6 drives the VCM 8 by the current corresponding to the level of a drive voltage VD applied from the DAC 4. The CPU 2 of the HDD generates 8-bit level control data applied through a data bus [7:0] to the DAC 4 to variably adjust the drive voltage VD according to the servo control modes. The DAC 4 converts the level control data into an analog signal corresponding to the drive voltage VD and applies the same to the VCM drive circuit 6. The VCM drive circuit 6 then amplifies the drive voltage VD with one of two current gains respectively having high and low value selected according to the gain switching signal GAIN to generate a current applied to the VCM 8. The VCM drive circuit 6 may be a servo driver integrated circuit (IC) ML4408 manufactured by Micro Linear Company. The CPU 2 selects a high current gain for a long track seeking mode or a low current gain for a short track seeking mode or a track following mode. Accordingly, the gain switching is performed when the servo mode change occurs between the following mode and the long track seeking mode or between the long track seeking mode and the short track seeking mode.

As a result of the gain switching, however, the VCM often causes the magnetic head to overshoot the target track when the magnetic head is moved between tracks, which will result in an unacceptable delay in the arrival of the magnetic head to the target track centerline. Such overshooting can be serious especially when the switching to the low current gain is performed for the track following mode after the long track seeking mode has increased the drive current of the VCM 8 by the high current gain to move the head to a desired track. This is caused by the abrupt change of the current amount applied to the VCM 8 when the gain switching is performed at or immediately after the time of the drive voltage VD being changed. The gain switching causes vibration of the VCM 8 resulting in operational errors in the servo control.

As previously described, in order to more precisely control the VCM 8, the drive voltage VD should be accurately adjusted by either improving the resolution capability of the DAC 4 or by employing a pulse width modulated (PWM) signal as the drive voltage VD. The first technique which seeks to improve the resolution capability of the DAC 4 can be costly and extremely difficult to implement. The second technique which seeks to employ and vary the duty of a pulse width modulated (PWM) signal as the drive voltage VD to adjust the current of the VCM is simpler and more cost effective, but still causes the magnetic head to overshoot due to the abrupt change of the current amount applied to the VCM between the pulses of the PWM signal. In order to minimize such overshooting, the timing of the gain switching has been controlled by software, which sets the timer of the CPU to properly delay the gain switching. However, the timing of the gain switching inevitably requires the CPU to wait for a delay time set by the timer and considerably overloads the CPU.

Figure 2:
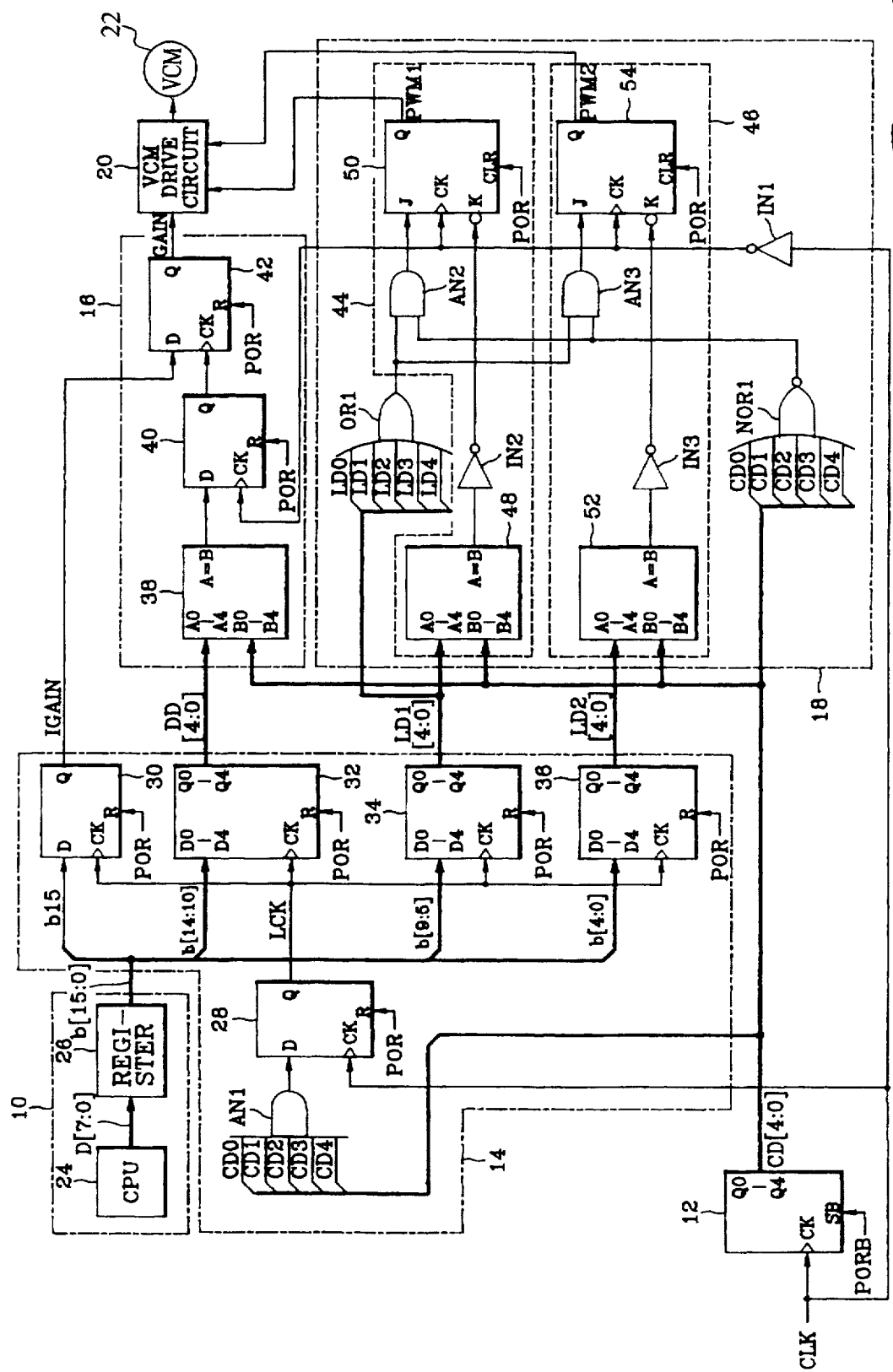
FIG. 2 illustrates a servo control system for controlling a VCM constructed according to the principles of the present invention.

Turning now to FIG. 2, which illustrates a servo control system constructed according to the principles of the present invention. The servo control system includes a control circuit 10 including a CPU 24 and a register 26, an asynchronous 5-digit counter 12, a latch circuit 14, a gain switching control circuit 16, a PWM signal generator 18, a VCM drive circuit 20 and a VCM 22.

A first and a second PWM signal PWM1 and PWM2 are used as a drive voltage $V_D$ for adjusting the current applied to the VCM 22. The CPU 24 which serves to control the overall operation of a HDD, first loads the register 26 gain switching data, first and second level control data, and delay data to control the VCM 22. The gain switching data is set as "high" or "low" to select high or low current gain according to the servo control modes. The first and second level control data are to variably adjust the level of the drive voltage for the VCM 22 so as to define respectively the duties of the first and the second PWM signal PWM1 and PWM2. The delay data is used to control the timing of the gain switching, which is performed after the time corresponding to the delay data from the first and the second PWM signal PWM1 and PWM2.

Figure 3:
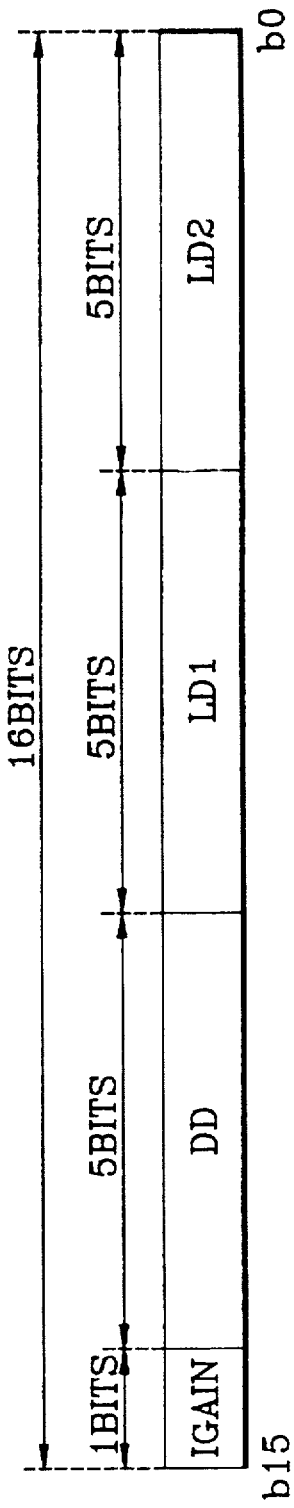
FIG. 3 illustrates memory allocation of a register in the servo control system as shown in FIG. 2.

For example, assuming that the gain switching data is defined by a single bit, the first and the second level control data respectively by five bits, and the delay data by five bits, the register 26 is constructed as shown in FIG. 3. Namely, reference numeral IGAIN represents the gain switching data of one bit, DD the delay data of five bits, and LD1 and LD2 respectively the first and the second level control data of five bits. The data bits b[15:0] loaded on the register 26 are applied to the latch circuit 14.

The asynchronous 5-digit counter 12 includes a clock terminal coupled to receive a clock CLK of a given frequency as shown in FIG. 5A, and a strobe terminal SB coupled to receive an inverted power-on reset signal PORB. The asynchronous 5-digit counter 12 which is enabled when the inverted power-on-reset signal PORB applied to the strobe terminal SBI is high, repeatedly counts the pulses of the clock CLK from the initial value "00h" to the maximum value "1Fh" to generate a count data CD[4:0] as shown in FIG. 5B. The count data CD[4:0] is commonly applied to the latch circuit 14, the gain switching control circuit 16, and the PWM signal generator 18.

The latch circuit 14 comprises an AND gate AN1 and five D flip-flops 28 to 36 so as to latch the output data bits b[15:0] of the register 26 to generate the gain switching data IGAIN, delay data DD[4:0], first and second level control data LD1[4:0] and LD2[4:0] whenever the count data CD[4:0] reaches the maximum value "1Fh".

More specifically, the AND gate AN1 logically multiplies all the count data CD[4:0], and the D-flip-flop 28 latches the output of the AND gate AN1 by the clock CLK. Hence, the output of the AND gate AN1 is "high" for one period of the clock CLK whenever the count data CD[4:0] reaches "1Fh" so that the D-flip-flop 28 generates a latch clock signal LCK exhibiting a "high" pulse as shown in FIG. 5C whenever the count data CD[4:0] reaches the initial value "00h". Meanwhile, the D flip-flop 30 has an input terminal D connected with the uppermost bit b15 of the data bits b[15:0] of the register 26 to latch the data bit b15 in response to the latch clock signal LCK, thereby generating the gain switching data IGAIN whenever the counter data CD[4:0] reaches the initial value "00h". The D-flip-flop 32 has input terminals D0-D4 respectively connected with the data bits b[14:10] of the data bits b[15:0] of the register 26 to latch the data bits b[14:10] in response to the latch clock signal LCK, thereby generating the delay data DD[4:0] of five bits whenever the counter data CD[4:0] reaches the initial value "00h". The D-flip-flop 34 has input terminals D0-D4 respectively connected with the data bits b[9:5] of the data bits b[15:0] of the register 26 to latch the data bits b[9:5] in response to the latch clock signal LCK, thereby generating the first level control data LD1[4:0] of five bits whenever the counter data CD[4:0] reaches the initial value "00h". The D flip-flop 36 has the input terminals D0-D4 respectively connected with the data bits b[4:0] of the data bits b[15:0] of the register 26 to latch the data bits b[4:0] in response to the latch clock signal LCK, thereby generating the second level control data LD2[4:0] of five bits whenever the counter data CD[4:0] reaches the initial value "00h". All the D-flip-flops 28 to 36 are reset by the power-on-reset signal POR. Among the outputs of these D-flip-flops, the gain switching data IGAIN and the delay data DD[4:0] are applied to the gain switching control circuit 16, and the first and the second level control data LD1[4:0], and LD2[4:0] to the PWM signal generator 18.

The PWM signal generator 18 comprises an OR gate OR1, a first and a second PWM signal generating circuit 44 and 46, a NOR gate, and an inverter IN1, so as to generate the first and the second PWM signals PWM1 and PWM2 with its respective duties corresponding to the values of the first and the second level control data at the period of the count range of the counter 12. The OR gate OR1 logically combines all the first level control data LD1[4:0] to generate a "high" signal. The NOR gate NOR1 processes all the count data CD[4:0] on negative logic combination to generate a "high" signal when the count data CD[4:0] reaches "00h". The inverter IN1 then inverts the clock signal CLK. The first PWM signal generating circuit 44 comprises a comparator 48, an inverter IN2, an AND gate AN2, and a JK flip-flop 50 while the second PWM signal generating circuit 46 of a comparator 52, an inverter IN3, an AND gate AN3, and a JK-flip-flop 54.

The comparator 48 of the first PWM signal generating circuit 44 compares the count data CD[4:0] with the first level control data LD1[4:0] to generate a "high" signal when the two values are equal. The output of the comparator 48 is applied through the inverter IN2 to the input terminal K of the JK flip-flop 50, whose input terminal J is connected with the output terminal of the AND gate AN2 to logically multiply the outputs of the OR gate OR1 and the NOR gate NOR1. The output of the comparator 52 is applied through the inverter IN3 to the input terminal K of the JK flip-flop 54, whose input terminal J is connected with the output terminal of the AND gate AN3 to logically multiply the outputs of the OR gate OI11 and the NOR gate NOR1. The JK flip-flops 50 and 54 have the clock terminals CK connected to the output terminal of the inverter IN1, reset by the power-on-reset signal POR.

The CPU 24 initially loads the value of the first level control data LD1[4:0] on the register 26 as "1Fh", so that the OR gate ORI generates a "high" signal. If the value of the count data CD[4:0] of the counter 12 is "00h", the NOR gate NOR1 outputs "high" signal making the outputs of the AND gates AN2 and AN3 "high", so that the outputs of the JK-flip-flops 50 and 54 become "high". In the track seeking mode or the track following mode, the CPU 24 sends, as previously described, the gain switching data IGAIN, the first and the second level control data LD1 and LD21, and the delay data DD through the data bus D[7:0] to the register 26. Hereinafter, the operation will be described with assuming that the CPU 24 generates the first and the second level control data LD1[4:0] and LD2[4:0] respectively as "0Ah" and "15h", and loads the delay data DD[4:0] on the register 26 as "03h".

Whenever the value of the count data CD[4:0] becomes "00h", the output of the NOR gate NOR1 becomes "high" to set the JK-flip-flops 50 and 54 to make the first and the second PWM signals PWM1 and PWM2 "high". On the contrary, when the value of the count data CD[4:0] becomes "Oah", the output of the comparator 48 becomes "high" to reset the JK flip-flop 50 to make the first and the second PWM1 and PWM2 "low". In addition, whenever the count data CD[4:0] has the value of "15h", the output of the comparator 52 becomes "high" to reset the JK flip-flop 54 to make the second PWM signal PWM2 "low". Thus, as shown in FIG. 5D, the first PWM signal PWM1 is generated with a duty corresponding to the first level control data LD1[4:0] as shown in FIG. 5B. Similarly, the second PWM signal PWM2 as shown in FIG. 5E is generated with a duty corresponding to the second level control data LD2[4:0]= "15h". Thus, the CPU 24 adjusts the duties of the first and the second PWM signal PWM1 and PWM2 by changing the values of the first and the second level control data LD1[4:0] and LD2[4:0]. The first and the second PWM signal PWM1 and PWM2 are applied to the VCM drive circuit 20 as a drive voltage $V_D$.

The gain switching control circuit 16 includes a comparator 38 and two D flip-flops 40 and 42. The comparator 38 compares the count data CD[4:0] with the delay data DD[4:0] to generate a "high" signal when the two values are equal. The output of the comparator 38 is then applied to the input terminal D of the D flip-flop 40 which also receives the output of the inverter IN1 as the clock signal. The output of the D-flip-flop 40 is connected to the clock terminal CK of the D-flip-flop 42. The input terminal D of the D-flip-flop 42 is applied with the gain switching data IGAIN generated from the D-flip-flop 30 of the latch circuit 14. Accordingly, whenever the count data CD[4:0] has the value of "03h", the output of the comparator 38 becomes "high" to enable the D flip-flop 40 to generate a "high" signal applied to the clock terminal of the D-flip-flop 42, which latches the gain switching data IGAIN to generate the gain switching signal GAIN applied to the VCM drive circuit 20. The VCM drive circuit 20, as shown in FIG. 2, drives the VCM 22 by the current corresponding to the level of the drive voltage generated by the first and the second PWM signals PWM1 and PWM2 and the high or low current gain selected according to the gain switching signal GAIN.

When the operation is to be shifted from the long track seeking mode to the track following mode after the transducer head has been moved to a target track by increasing the drive current of the VCM 22 with the high current gain, the CPU 24 changes the gain switching data IGAIN from a "high" to a "low" state in order to switch to the low current gain. For example, if the gain switching data IGAIN is changed from "high" to "low" state at time t0 as shown in FIG. 5F, the gain switching signal GAIN of the D flip-flop 42 is switched to "low" state at time t2 as shown in FIG. 5G delayed by the value "03h" of the delay data DD[4:0] from the starting point t1 of the next pulses of the first and the second PWM signal PWM1 and PWM2.

The value of the delay data DD[4:0] is determined to accommodate to each of the HDDs employing the servo control system of FIG. 2. The timing of the gain switching in each HDD is obtained by testing rather than by calculation at a design stage. For example, the value of the delay data DD[4:0] is varied for gain switching until the overshooting of the VCM 22 is minimized. This value is set as the delay value for the HDD. Then, the gain switching signal GAIN is generated after being delayed by the time according to the value of the delay data DD[4:0] from the starting point of the next PWM pulse regardless of the time when the CPU 24 changes the gain switching data IGAIN according to changing of the servo control mode, thus reducing the overload of the CPU as well as stabilizing the operation of the VCM.

Figure 4:
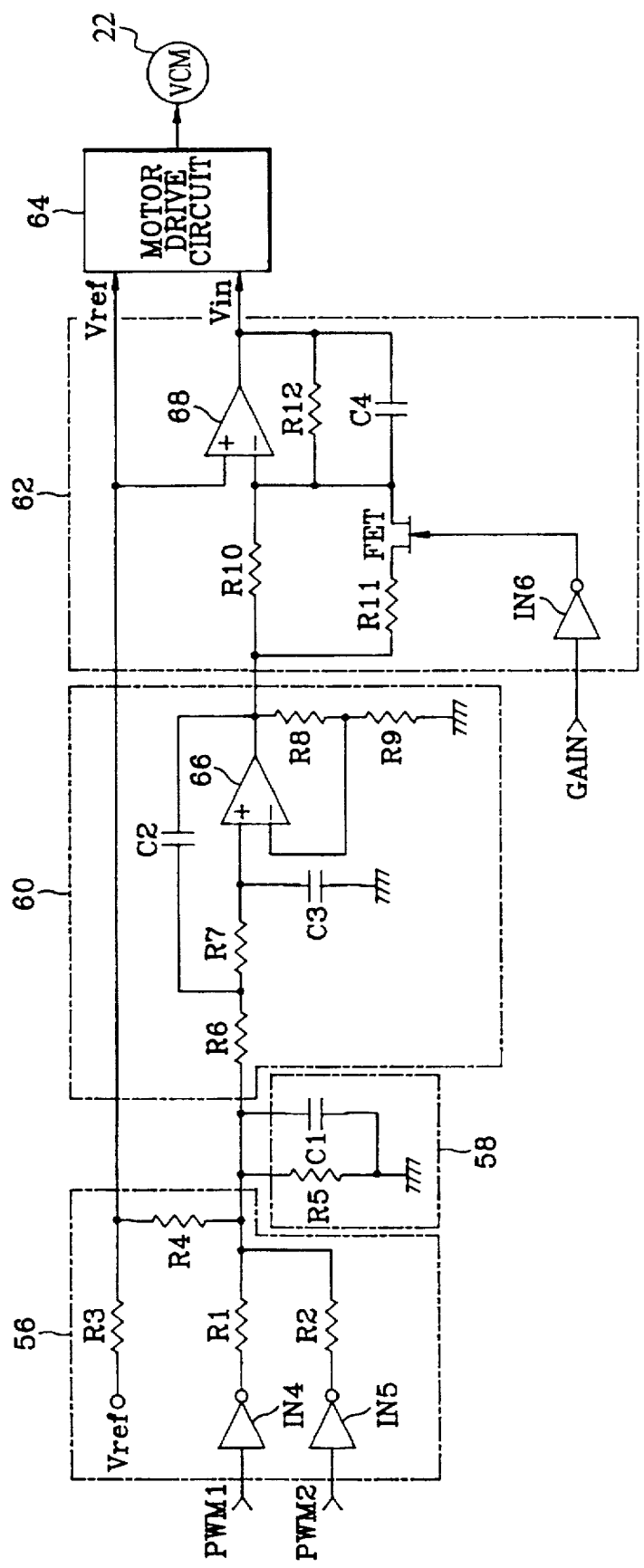
FIG. 4 is a detailed circuit diagram for illustrating the VCM drive circuit 20 shown in FIG. 2.

As described, the VCM drive circuit 20 drives the VCM 22 in response to the first and the second PWM signal PWM1 and PWM2 generated from the first and the second PWM generating circuits 44, 46 and the gain switching signal GAIN generated from the gain switching control circuit 16. As shown in FIG. 4, the VCM drive circuit 20 includes an overlapping circuit 56, a filter circuit 58, a conventional amplifying circuit 60, a gain switching amplifying circuit 62, and a motor drive circuit 64 for driving the VCM 22.

The overlapping circuit 56 comprises two inverters IN4 and IN5 respectively receiving the first and the second PWM signal PWM1 and PWM2, two resistors R3 and R4 connected in series with the reference voltage Vref, and two resistors R1 and R2 respectively connected between the resistor R4 and the outputs of the two inverter IN4 and IN5. The first and the second PWM signal PWM1 and PWM2 are adjusted to have a given voltage through the inverters IN4, IN5 and the resistors R1, R2, overlapping each other. The overlapping ratio between the first and the second PWM signal PWM1 and PWM2 may be selectively determined by adjusting the ratio between the two resistors R1 and R2. For example, if the resistor R1 is selected to have a value lower than the value of the resistor R21 the voltage level of the first PWM signal PWM1 is overlapped by a greater proportion to the voltage level of the second PWM signal PWM 2. In this way, the CPU 24 may adjust the drive current of the VCM 22 approximately by means of the first level control data LD2[4:0] and precisely by means of the second level control data LD2[4:0].

The output terminal of the overlapping circuit 56 is connected with the filter circuit 58 consisting of a resistor R5 and a capacitor C1 to eliminate any noise accompanying the overlapped voltage level. The filtered voltage level is amplified by the conventional amplifying circuit 60 comprising the resistors R6, R9, capacitors C2, C3, and an operational amplifier 66, applied to a gain switching amplifying circuit 62. The gain switching amplifying circuit 62 comprises an operational amplifier 68 with the non-inverting input terminal (+) connected via a resistor R3 to the reference voltage Vref and the inverting input terminal (−) connected via a resistor R10 to the output of the amplifying circuit 60. The resistor R10 is connected in parallel with another resistor R11 connected in series with a transistor FET. A resistor R12 is connected in parallel with a capacitor C4 between the inverting input terminal (−) and the output terminal of the operational amplifier 68. The gate of the transistor FET is applied with the gain switching signal GAIN through an inverter IN6. The amplitude gain is selected to have a high or low gain according to the logic state of the gain switching signal GAIN. The amplified voltage Vin is applied to the motor drive circuit 64 with the reference voltage Vref so as to drive the VCM 22. As contemplated by the present invention, the motor drive circuit 64 may be constructed by a servo motor drive IC EL3036C/EL3037C/EL3038C manufactured by the Elantec Company.

Thus, the drive current of the VCM 22 may not only be varied by means of the PWM signals, but also the gain switching may be automatically performed according to changing of the servo control mode at the time when the overshooting of the VCM 22 is minimized, so that the overloading of the CPU is minimized and the VCM is stably operated. In addition, a single PWM signal may be employed as a drive voltage instead of overlapping the first and the second PWM signal. If a single PWM signal is used, then one of the two PWM signal generating circuit 40 and 42 is required. As a result, the count range of the counter 12 and the ranges of the level control data value and the delay data values may be varied to have different values.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A servo control system for a voice coil motor in a disk drive, said servo control system comprising:

voice coil motor drive means for driving said voice coil motor to position a transducer head over a disk by a control current generated in response to a drive voltage and adjusted to one of a high current and a low current in response to gain switching data;

data controller means for generating control data containing gain control data for generation of said gain switching data, and level control data to variably adjust the level of said drive voltage in accordance with a servo control mode of operation;

counter means for repeatedly counting clock pulses of a given frequency from an initial value to a last value within a count range to generate count data;

latch means for latching said control data to produce said gain control data, said level control data, and delayed data at each time of said initial value is reached by said counter means;

gain switching generator means for generating said gain switching data for adjustment of said control current to one of said high current and said low current in response to reception of said delayed data latched by said latch means at each time said count data corresponds to said delayed data; and pulse width modulated signal generator means for generating as said drive voltage a pulse width modulated signal having a duty corresponding to the value of said level control data latched by said latch means at a period of said count range.

2. The servo control system of claim 1, further comprised of said pulse width modulated signal generator means synchronizing a starting point of pulses of said pulse width modulated signal with the initial value of said count data.

3. The servo control system of claim 1, further comprised of said data controller means generating said control data containing said gain control data so as to generate said gain switching data for adjusting said control current to one of said high current and said low current each time said servo control mode is changed between a long track seeking mode, a short track seeking mode and a track following mode.

4. The servo control system of claim 2, further comprised of said data controller means generating said control data containing said gain control data so as to generate said gain switching data for adjusting said control current to one of said high current and said low current each time said servo control mode is switched between a long track seeking mode, a short track seeking mode and a track following mode.

5. The servo control system of claim 4, further comprised of said delayed data being set to exhibit a time value from the starting point of the pulses of said pulse width modulated signal to an overshoot of said voice coil motor each time said servo control mode is switched from said long track seeking mode to said track following mode.

6. The servo control system of claim 5, further comprised of said level control data and said delayed data each exhibiting a value determined within said count range.

7. The servo control system of claim 1, further comprised of counter means corresponding an asynchronous 5-digit counter having a clock terminal coupled to receive said clock pulses of said given frequency, a strobe terminal coupled to receive a power-on reset signal and an output terminal for generating said count data.

8. The servo control system of claim 1, further comprised of said latch means comprising:

an AND gate for logically combining discrete values of said count data to generate logic data;

a first D flip-flop having a data terminal coupled to receive said logic data, a clock terminal coupled to receive said clock pulses of said given frequency, a reset terminal coupled to receive a power-on reset signal, for generating latched clock pulses;

a second D flip-flop having a data terminal coupled to receive said control data, a clock terminal coupled to receive said latched clock pulses, a reset terminal coupled to receive said power-on reset signal, for generating said gain control data;

a third D flip-flop having a data terminal coupled to receive said control data, a clock terminal coupled to receive said latched clock pulses, a reset terminal coupled to receive said power-on reset signal, for generating said delayed data;

a fourth D flip-flop having a data terminal coupled to receive said control data, a clock terminal coupled to receive said latched clock pulses, a reset terminal coupled to receive said power-on reset signal, for generating a first of said level control data; and a fifth D flip-flop having a data terminal coupled to receive said control data, a clock terminal coupled to receive said latched clock pulses, a reset terminal coupled to receive said power-on reset signal, for generating a second of said level control data.

9. The servo control system of claim 1, further comprised of said gain switching generator means comprising:

a comparator for making a comparison between said delayed data latched by said latch means and said count data to produce comparator data;

a first D flip-flop having a data terminal coupled to receive said comparator data, a clock terminal coupled to receive an inverted of said clock pulses of said given frequency, a reset terminal coupled to receive a power-on reset signal, for generating latched comparator data; and a second D flip-flop having a data terminal coupled to receive said gain control data, a clock terminal coupled to receive said latched comparator data, a reset terminal coupled to receive said power-on reset signal, for generating said gain switching data.

10. A servo control system for a voice coil motor in a disk drive, said servo control system comprising:

voice coil motor drive means for driving said voice coil motor to position a transducer head over a disk by a control current generated in response to a drive voltage and adjusted to one of a high current and a low current in response to gain switching data;

data controller means for generating control data including gain control data for generation of said gain switching data, first and second level control data to variably adjust the level of said drive voltage in accordance with a servo control mode of operation;

counter means for repeatedly counting clock pulses of a given frequency from an initial value to a last value within a count range to generate count data;

latch means for latching said control data to produce said gain control data, said first and second level control data, and delayed data at each time of said initial value is reached by said counter means;

gain switching generator means for generating said gain switching data for adjustment of said control current to one of said high current and said low current in response to reception of said delayed data latched by said latch means at each time said count data corresponds to said delayed data; and pulse width modulated signal generator means for generating as said drive voltage a first and a second pulse width modulated signal each having a duty corresponding to a respective value of said first and second level control data latched by said latch means at a period of said count range.

11. The servo control system of claim 10, further comprised of said pulse width modulated signal generator means synchronizing a starting point of pulses of said first and said second pulse width modulated signal with the initial value of said count data.

12. The servo control system of claim 10, further comprised of said data controller means generating said control data including said gain control data so as to generate said gain switching data for adjusting said control current to one of said high current and said low current each time said servo control mode is changed between a long track seeking mode, a short track seeking mode and a track following mode.

13. The servo control system of claim 12, further comprised of said data controller means generating said control data including said gain control data so as to generate said gain switching data for adjusting said control current to one of said high current and said low current each time said servo control mode is switched between a long track seeking mode, a short track seeking mode and a track following mode.

14. The servo control system of claim 13, further comprised of said delayed data being set to exhibit a time value from the starting point of the pulses of said first and said second pulse width modulated signal to an overshoot of said voice coil motor each time said servo control mode is switched from said long track seeking mode to said track following mode.

15. The servo control system of claim 10, further comprised of counter means corresponding an asynchronous 5-digit counter having a clock terminal coupled to receive said clock pulses of said given frequency, a strobe terminal coupled to receive a power-on reset signal and an output terminal for generating said count data.

16. The servo control system of claim 10, further comprised of said latch means comprising:

an AND gate for logically combining discrete values of said count data to generate logic data;

a first D flip-flop having a data terminal coupled to receive said logic data, a clock terminal coupled to receive said clock pulses of said given frequency, a reset terminal coupled to receive a power-on reset signal, for generating latched clock pulses;

a second D flip-flop having a data terminal coupled to receive said control data, a clock terminal coupled to receive said latched clock pulses, a reset terminal coupled to receive said power-on reset signal, for generating said gain control data;

a third D flip-flop having a data terminal coupled to receive said control data, a clock terminal coupled to receive said latched clock pulses, a reset terminal coupled to receive said power-on reset signal, for generating said delayed data;

a fourth D flip-flop having a data terminal coupled to receive said control data, a clock terminal coupled to receive said latched clock pulses, a reset terminal coupled to receive said power-on reset signal, for generating a first of said level control data; and a fifth D flip-flop having a data terminal coupled to receive said control data, a clock terminal coupled to receive said latched clock pulses, a reset terminal coupled to receive said power-on reset signal, for generating a second of said level control data.

17. The servo control system of claim 10, further comprised of said gain switching generator means comprising:

a comparator for making a comparison between said delayed data latched by said latch means and said count data to produce comparator data;

a first D flip-flop having a data terminal coupled to receive said comparator data, a clock terminal coupled to receive an inverted of said clock pulses of said given frequency, a reset terminal coupled to receive a power-on reset signal, for generating latched comparator data; and a second D flip-flop having a data terminal coupled to receive said gain control data, a clock terminal coupled to receive said latched comparator data, a reset terminal coupled to receive said power-on reset signal, for generating said gain switching data.

18. The servo control system of claim 10, further comprised of said pulse width modulated signal generator means comprising:

a NOR gate for logically combining discrete values of said count data to produce first logic data;

a first comparator for making a comparison between said first level control data latched by said latch means and said count data to produce first comparator data;

an OR gate for logically combining discrete values of said first level control data to produce second logic data;

a first AND gate for logically combining said first and said second logic data to produce third logic data;

a first JK flip-flop having a first data terminal coupled to receive said third logic data, a second data terminal coupled to receive an inverted of said first comparator data, a clock terminal coupled to receive an inverted of said clock pulses of said given frequency, a reset terminal coupled to receive a power-on reset signal, for generating said first pulse width modulated signal;

a second comparator for making a comparison between said first level control data latched by said latch means and said count data to produce second comparator data;

a second AND gate for logically combining said first and said second logic data to produce fourth logic data;

a second JK flip-flop having a first data terminal coupled to receive said fourth logic data, a second data terminal coupled to receive an inverted of said second comparator data, a clock terminal coupled to receive an inverted of said clock pulses of said given frequency, a reset terminal coupled to receive said power-on reset signal, for generating said second pulse width modulated signal.

19. The servo control system of claim 10, further comprised of said voice coil motor drive means comprising:

an overlapping circuit for overlapping the voltage level of said first and said second pulse width modulated signal to produce an overlapped voltage level;

a gain switching amplifier for amplifying said overlapped voltage level by one of high and low current gain selected according to said gain switching data; and a motor drive circuit for driving said voice coil motor by the control current corresponding to the output voltage level of said gain switching amplifier.

20. The servo control system of claim 19, further comprised of said first pulse width modulated signal having an overlapped portion greater in proportion to that of said second pulse width modulated signal.

* * * * *